(12) United States Patent
Atharinia

(10) Patent No.: US 10,471,373 B2
(45) Date of Patent: Nov. 12, 2019

(54) WATER DISINFECTION METHOD AND APPARATUS

(71) Applicant: Vahid Atharinia, Tabriz (IR)

(72) Inventor: Vahid Atharinia, Tabriz (IR)

(*) Notice: Subject to any disclaimer, the term of this patent is extended or adjusted under 35 U.S.C. 154(b) by 0 days.

(21) Appl. No.: 16/101,432

(22) Filed: Aug. 11, 2018

(65) Prior Publication Data
US 2018/0345182 A1 Dec. 6, 2018

Related U.S. Application Data

(60) Provisional application No. 62/544,123, filed on Aug. 11, 2017.

(51) Int. Cl.
*B01D 29/68* (2006.01)
*C02F 1/00* (2006.01)
(Continued)

(52) U.S. Cl.
CPC ......... *B01D 29/68* (2013.01); *B01D 29/0004* (2013.01); *B01D 29/661* (2013.01); *B01D 29/925* (2013.01); *B01D 35/16* (2013.01); *C02F 1/004* (2013.01); *C02F 1/20* (2013.01); *C02F 1/74* (2013.01); *B01D 2201/082* (2013.01);
(Continued)

(58) Field of Classification Search
None
See application file for complete search history.

(56) References Cited

U.S. PATENT DOCUMENTS 2,736,434 A * 2/1956 Yacoe .................... C10B 53/02
210/178
2,935,200 A * 5/1960 Lutz .................... B01D 33/333
160/40
(Continued)

FOREIGN PATENT DOCUMENTS

CN 103466876 B 3/2016
WO WO-2019030738 A1 * 2/2019 ............. B01D 29/68

OTHER PUBLICATIONS

Written Opinion of PCT/IB/056069 dated Oct. 16, 2018; six pages.*
(Continued)

*Primary Examiner* — Robert J Popovics
(74) *Attorney, Agent, or Firm* — Bajwa IP Law Firm; Haris Zaheer Bajwa

(57) ABSTRACT

Disclosed herein a method and an apparatus for disinfecting water. The method comprises pumping the water into a top disinfection section comprising a water distributing tray and a first filtration system, filtering a first set of particles from the water, discharging particles from the first set of particles to a sewage from a bottom of a respective filter box of the plurality of filter boxes by pumping a high-pressure stream of water to a back side of the respective strainer, generating filtered water by filtering a second set of particles from the water by passing the water through a bottom disinfection section, the bottom disinfection section comprising a plurality of filtering layers, removing the second set of particles settled in the bottom disinfection section utilizing a vacuum-cleaning system, and reducing microorganisms and ammonia gases in the filtered water by aerating the filtered water comprising exposing the filtered water to a high-pressure stream of air utilizing a plurality of fans.

18 Claims, 9 Drawing Sheets

(51) Int. Cl.
*B01D 29/00* (2006.01)
*B01D 29/66* (2006.01)
*B01D 35/16* (2006.01)
*B01D 29/92* (2006.01)
*C02F 1/20* (2006.01)
*C02F 1/74* (2006.01)
*C02F 103/20* (2006.01)
*C02F 103/34* (2006.01)
*C02F 101/16* (2006.01)

(52) U.S. Cl.
CPC ...... *C02F 2101/16* (2013.01); *C02F 2103/20* (2013.01); *C02F 2103/34* (2013.01); *C02F 2201/007* (2013.01); *C02F 2303/04* (2013.01); *C02F 2303/16* (2013.01)

(56) References Cited

U.S. PATENT DOCUMENTS

| | | | | | |
|---|---|---|---|---|---|
| 3,397,787 | A | * | 8/1968 | Mini | B01D 33/19 210/139 |
| 3,515,199 | A | * | 6/1970 | Summers | B01D 1/00 159/1.1 |
| 3,559,807 | A | * | 2/1971 | Reilly | B01D 33/04 210/769 |
| 3,577,678 | A | * | 5/1971 | Burton | A01G 9/18 47/58.1 R |
| 3,899,426 | A | * | 8/1975 | Hirs | B01D 29/096 210/387 |
| 3,943,233 | A | * | 3/1976 | Swanson | B01D 33/04 423/332 |
| 4,043,047 | A | * | 8/1977 | Galliker | C02F 11/12 210/748.01 |
| 4,052,310 | A | * | 10/1977 | Nolan | B03C 1/03 210/222 |
| 4,137,169 | A | * | 1/1979 | El-Hindi | B01D 29/605 210/97 |
| 4,203,836 | A | * | 5/1980 | Hallack | B01D 29/09 210/665 |
| 4,233,157 | A | * | 11/1980 | Miller | B01D 29/096 210/137 |
| 4,267,060 | A | * | 5/1981 | Miller | B01D 29/096 210/103 |
| 4,477,350 | A | * | 10/1984 | Brandt | B01D 29/096 210/387 |
| 4,477,358 | A | * | 10/1984 | Heintges | B01D 29/096 210/783 |
| 4,719,772 | A | * | 1/1988 | Bastanzuri | D21B 1/325 162/297 |
| 4,908,136 | A | * | 3/1990 | Chou | B01D 24/30 210/248 |
| 5,091,079 | A | * | 2/1992 | Gayman | A62D 3/33 210/175 |
| 5,133,883 | A | * | 7/1992 | Prinssen | B01D 33/04 210/783 |
| 5,221,472 | A | * | 6/1993 | Ikeda | B01D 29/09 210/389 |
| 5,246,574 | A | * | 9/1993 | Jorgens | B09B 3/00 210/175 |
| 5,308,487 | A | * | 5/1994 | Thissen | B01D 33/747 210/400 |
| 5,368,732 | A | * | 11/1994 | Pierson | B01D 29/09 210/386 |
| 5,482,594 | A | * | 1/1996 | Salminen | B01D 29/09 162/60 |
| 5,527,458 | A | * | 6/1996 | Gehrmann | B01D 33/04 210/177 |
| 5,571,404 | A | * | 11/1996 | Derenthal | B01D 33/04 210/97 |
| 5,643,468 | A | * | 7/1997 | Ure | B01D 33/04 210/771 |
| 5,840,187 | A | * | 11/1998 | Derenthal | F26B 3/283 210/400 |
| 6,350,377 | B1 | * | 2/2002 | Kollmar | C02F 1/56 210/198.1 |
| 6,423,216 | B1 | | 7/2002 | Yum et al. | |
| 6,495,031 | B1 | * | 12/2002 | Bratten | B01D 29/096 210/97 |
| 6,622,870 | B1 | * | 9/2003 | Prinssen | B01D 33/747 210/398 |
| 6,846,421 | B2 | * | 1/2005 | Bratten | B01D 29/096 210/741 |
| 7,029,579 | B2 | * | 4/2006 | Tapp | B01D 29/09 210/193 |
| 7,288,197 | B2 | | 10/2007 | Shao et al. | |
| 7,674,379 | B2 | | 3/2010 | Vanotti et al. | |
| 7,736,526 | B2 | * | 6/2010 | Smith | B01D 33/15 210/391 |
| 8,123,941 | B2 | * | 2/2012 | Venville | B01D 24/007 210/265 |
| 8,297,447 | B2 | * | 10/2012 | Sorenson | B01D 29/03 134/172 |
| 8,545,133 | B2 | * | 10/2013 | Fumita | B01D 29/09 406/187 |
| 8,673,156 | B2 | * | 3/2014 | Griffin | B01D 1/14 210/175 |
| 9,114,340 | B2 | * | 8/2015 | Smith | B01D 33/04 |
| 9,468,876 | B2 | * | 10/2016 | Bornes | B01D 29/05 |
| 9,696,288 | B2 | * | 7/2017 | Kashima | G01N 1/2202 |
| 2003/0121843 | A1 | * | 7/2003 | Bratten | B01D 29/096 210/398 |
| 2004/0134863 | A1 | * | 7/2004 | Tapp | B01D 29/09 210/783 |
| 2008/0302715 | A1 | * | 12/2008 | Venville | B01D 24/007 210/283 |
| 2009/0226840 | A1 | * | 9/2009 | Fumita | B01D 29/09 430/137.1 |
| 2010/0096341 | A1 | * | 4/2010 | Benesi | B01D 25/1275 210/771 |
| 2010/0213141 | A1 | * | 8/2010 | Griffin | B01D 1/14 210/774 |
| 2011/0089122 | A1 | * | 4/2011 | Smith | B01D 33/04 210/774 |
| 2014/0238106 | A1 | * | 8/2014 | Kashima | G01N 1/2202 73/23.2 |
| 2015/0136677 | A1 | * | 5/2015 | Bornes | B01D 29/05 210/234 |
| 2018/0345182 | A1 | * | 12/2018 | Atharinia | B01D 29/68 |

OTHER PUBLICATIONS

Dvorak et al. "Anaerobic membrane bioreactors—a mini review with emphasis on industrial wastewater treatment: applications, limitations" In Desalination and water treatment, Nov. 2015, pp. 1-15.

* cited by examiner

WATER DISINFECTION METHOD AND APPARATUS

CROSS-REFERENCE TO RELATED APPLICATION

This application claims the benefit of priority from U.S. Provisional Patent Application Ser. No 62/544,123 filed on Aug. 11, 2017, and entitled "INDUSTRIAL WATER FILTRATION SYSTEM" which is incorporated herein by reference in its entirety.

TECHNICAL FIELD

The present disclosure generally relates to water disinfection systems, and particularly to a method and an apparatus for disinfecting water by passing the water through different filtration units.

BACKGROUND

In recent decades, water consumption has globally increased sharply as a consequence of rapid world population growth, along with accelerated industrialization and urbanization. Also, discharge rates of various domestic sewage, industrial wastewater, and livestock wastewater have increased, thereby contaminating various streams and lakes. Stream contamination may destroy the ecosystem and also may increase water purification costs due to the deterioration of the quality of different water sources and may also paralyze some of water treatment facilities.

On the other hand, while 70% of the surface of the globe is covered by water, fresh water represents only 2% of the total global water supply of which 90% is not usable as it is in the form of ice in the poles. Due to this limitation, it is necessary to seriously consider water reuse (recycling) and optimization of its consumption to be able to partially compensate for this limitation. On the other hand, most of the consumed water is converted into sewage, having a severely negative impact on the environment and human health due to sewage containing industrial toxins which cause deterioration of underground and surface water quality by entering underground water tables, rivers, and seas.

The measures taken so far to address the issues related to water treatment may include, use of screens or basins for settling suspended particles in water, use of sand (gravel) filters, use of chemical coagulants, or pressure systems, etc. The use of settling basins requires constructing multiple basins entailing using a vast area of land, leading it them to be costly and time consuming to construct.

Slow sand filters are known to be effective in removing bacteria, parasites, Giardia cysts, cryptosporidium oocysts, and viruses. Slow sand filters differ from all other filters used to treat drinking water in that they work by using a complex biological film that grows naturally on the surface of the sand. The sand itself does not perform any filtration function but simply acts as a substrate, unlike its counterparts for UV and pressurized treatments. Although they are often preferred technology in many developing countries because of their low energy requirements and robust performance, they are also used to treat water in some developed countries While bacteria, parasites, may be killed or rendered inactive with disinfection in slow sand filters, dormant cysts and oocysts are very resistant to disinfection unless a respective disinfectant is administered very intensively. Slow sand filters may be used to supply clean water directly for consumption or may be used to supply water for further treatment, such as by reverse osmosis and ultra-filtration, both of which processes require relatively clean water to begin with. In other words, reverse osmosis and ultrafiltration are not able to filter significantly infected water.

A slow sand filter is, generally, able to remove a small amount of ammonium, manganese, bacteria, and odorant from the raw water through the biological decomposition. However, the slow sand filter is, generally, not able to remove large amounts of the contaminants because it does not utilize coagulation and flocculation processes. On the other hand, in a rapid sand filter system that may be used to substitute a slow sand filter, suspended materials in the raw water may be agglomerated in a flocculation process, settled in a sedimentation basin and sieved through a granular media consisting of sand and gravel. Although the performance of a rapid sand filter is better than a slow sand filter for most water sources, it may also be associated with some challenges based on concentration and species of the contaminants in the raw water. Especially when algae bloom due to the eutrophication of water in a reservoir or in a stagnated stream, disinfection function of the rapid sand filter may attenuate rapidly due to the high volume of contaminants.

Sand filters (also called gravel filters) generally need pre-treatment and they are not efficient for waters with a high concentration in terms of abundance of suspended particles. During washing of a sand filter, the water disinfection operation is paused and the sand filters are being washed and large amounts of water is consumed for washing the filter.

In high-pressure filtration systems, the use of hydraulic pressure to increase discharge rate leads to finer particles or increased dissolution of particles inside water, thus increasing and complicating the treatment process, and subsequently leading to increase in treatment costs. Therefore, there is a need for a simple and low-cost system for disinfecting water.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

According to one or more embodiments, the present disclosure describes a method for disinfecting water. According to one or more exemplary embodiments, the method may be performed by pumping the water into a top disinfection section comprising a water distributing tray and a first filtration system, the water distributing tray comprising a plurality of parallel slots and the first filtration system comprising a plurality of filter boxes arranged in a closed path. In an exemplary embodiment, the method may further comprise filtering a first set of particles from the water.

In some exemplary embodiments, filtering a first set of particles from the water may comprise dispensing the water into the plurality of filter boxes first passing the water through the water distributing tray, and filtering the first set of particles from the dispensed water utilizing strainers in the plurality of filter boxes by moving the plurality of filter boxes cyclically along the closed path.

In an exemplary embodiment, each filter box from the plurality of filter boxes may comprise a respective strainer at a bottom of the filter box, and a respective plurality of parapet walls may be attached seamlessly to an outermost circumference of the respective strainer. In an embodiment, also an inclined elongated part may be attached to a first parapet wall from the respective plurality of parapet walls.

In some exemplary embodiments, the method may further include discharging particles from the first set of particles to a sewage from a bottom of a respective filter box of the plurality of filter boxes by pumping a high-pressure stream of water to a back side of the respective strainer. In an embodiment the method may include generating filtered water by filtering a second set of particles from the water by passing the water through a bottom disinfection section, the bottom disinfection section comprising a plurality of filtering layers.

In some exemplary embodiments, the method may further include removing the second set of particles settled in the bottom disinfection section utilizing a vacuum-cleaning system, and reducing microorganisms and ammonia gases in the filtered water by aerating the filtered water comprising exposing the filtered water to a high-pressure stream of air utilizing a plurality of fans.

In an exemplary embodiment, the plurality of filtering layers may comprise a thick grid layer including a first plurality of perforations, a sensitive grid layer including a second plurality of perforations, a sand membrane layer including a plurality of granules, and a super-sensitive grid layer including a third plurality of perforations. In some exemplary embodiments, a diameter of each perforation from the second plurality of perforations may be smaller than a diameter of each perforation from the first plurality of perforations, and a diameter of each perforation from the third plurality of perforations may be smaller than a size of each granule from the plurality of granules.

In some exemplary embodiments, the sensitive grid layer may be disposed immediately under the thick grid layer, and the sand membrane layer may be disposed immediately under the sensitive grid layer, and the super-sensitive grid layer may be disposed immediately under the sand membrane layer. In an embodiment, the super-sensitive grid layer may prevent the plurality of granules from passing through perforations of the third plurality of perforations.

In an exemplary embodiment, filtering the first set of particles from the dispensed water utilizing strainers in the plurality of filter boxes by moving the plurality of filter boxes cyclically along the closed path may comprise filtering suspended particles greater than 500 μm from the water. In an embodiment, the inclined elongated part may comprise a rectangular steel plate wherein the inclined elongated part may cover a gap between two adjacent filter boxes from the plurality of filter boxes and also may provide a gable-roof type facility for the gap. In an embodiment, the closed path may comprise at least one of a closed elliptical path and a closed circular path.

In some exemplary embodiments, removing the second set of particles settled in the bottom disinfection section utilizing a vacuum-cleaning system may comprise removing the second set of particles settled in the bottom disinfection section through a suction mechanism wherein the vacuum-cleaning system may comprise a plurality of funnels in flow communication with a vacuum tank. In an embodiment, the vacuum-cleaning system may suck the second set of particles from the bottom disinfection section during a reciprocating movement of the plurality of funnels. In an embodiment, the reciprocating movement of the plurality of funnels may comprise moving the plurality of funnels back and forth along a length of the bottom disinfection section.

In an exemplary embodiment, the method may further comprise stopping the suction mechanism and reciprocating movement of the plurality of funnels and discharging particles accumulated in the vacuum tank from the vacuum tank into the sewage.

According to one or more embodiments, the present disclosure describes an apparatus for disinfecting water. In an exemplary embodiment, the apparatus may comprise a top disinfection section comprising a water distributing tray and a first filtration system wherein the water distributing tray may comprise a plurality of parallel slots and the first filtration system comprising a plurality of filter boxes arranged in a closed path.

In an embodiment, the water distribution tray may be configured to pass the water though the parallel slots into the plurality of filter boxes first passing the water through the water distributing tray. In an embodiment, each filter box from the plurality of filter boxes may comprise a respective strainer at a bottom of the filter box, and a respective plurality of parapet walls may be attached seamlessly to an outermost circumference of the respective strainer. In an exemplary embodiment, an inclined elongated part may be attached to a first parapet wall from the respective plurality of parapet walls.

In some exemplary implementations, the first filtration system may be configured to move the plurality of filter boxes cyclically along the closed path and also may be configured to filter the first set of particles from the dispensed water utilizing strainers in the plurality of filter boxes due to the movement of the plurality of boxes. In an embodiment the first filtration system may also be configured to pump a high-pressure stream of water to a back side of the respective strainer; and discharge particles from the first set of particles to a sewage from a bottom of a respective filter box of the plurality of filter boxes utilizing the high pressure stream.

In an exemplary embodiment, the apparatus may further comprise a bottom disinfecting section comprising a plurality of filtering layers. In an embodiment, the plurality of filtering layers may be configured to filter a second set of particles from the water by passing the water through the plurality of filtering layers to produce filtered water and remove the second set of particles settled in the bottom disinfection section utilizing a vacuum-cleaning system.

In some exemplary embodiments, the bottom disinfecting section may further comprise a plurality of fans configured to expose the filtered water to a high-pressure stream of air to reduce microorganisms and ammonia gases existing in the filtered water by aerating the filtered water. In an embodiment, the plurality of filtering layers may comprise a thick grid layer including a first plurality of perforations, a sensitive grid layer including a second plurality of perforations, a sand membrane layer including a plurality of granules, and a super-sensitive grid layer including a third plurality of perforations.

In an exemplary embodiment, a diameter of each perforation from the second plurality of perforations may be smaller than a diameter of each perforation from the first plurality of perforations. In an embodiment, a diameter of each perforation from the third plurality of perforations may be smaller than a size of each granule from the plurality of granules.

In an exemplary embodiment, the sensitive grid layer may be disposed immediately under the thick grid layer, and the sand membrane layer may be disposed immediately under the sensitive grid layer, and the super-sensitive grid layer may be disposed immediately under the sand membrane layer. In an exemplary embodiment, the super-sensitive grid layer may be configured to prevent the plurality of granules from passing through perforations of the third plurality of perforations.

In an exemplary embodiment, the inclined elongated part may comprise a rectangular steel plate. In an embodiment, the inclined elongated part may cover a gap between two adjacent filter boxes from the plurality of filter boxes and may also provide a gable-roof type facility for the gap. In an embodiment, the closed path may comprise at least one of a closed elliptical path and a closed circular path.

In some exemplary embodiments, the vacuum-cleaning system may comprise a plurality of funnels in flow communication with a vacuum tank wherein the vacuum-cleaning system sucks the second set of particles from the bottom disinfection section during a reciprocating movement of the plurality of funnels and wherein the reciprocating movement of the plurality of funnels comprises moving the plurality of funnels back and forth along a length of the bottom disinfection section.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1A:
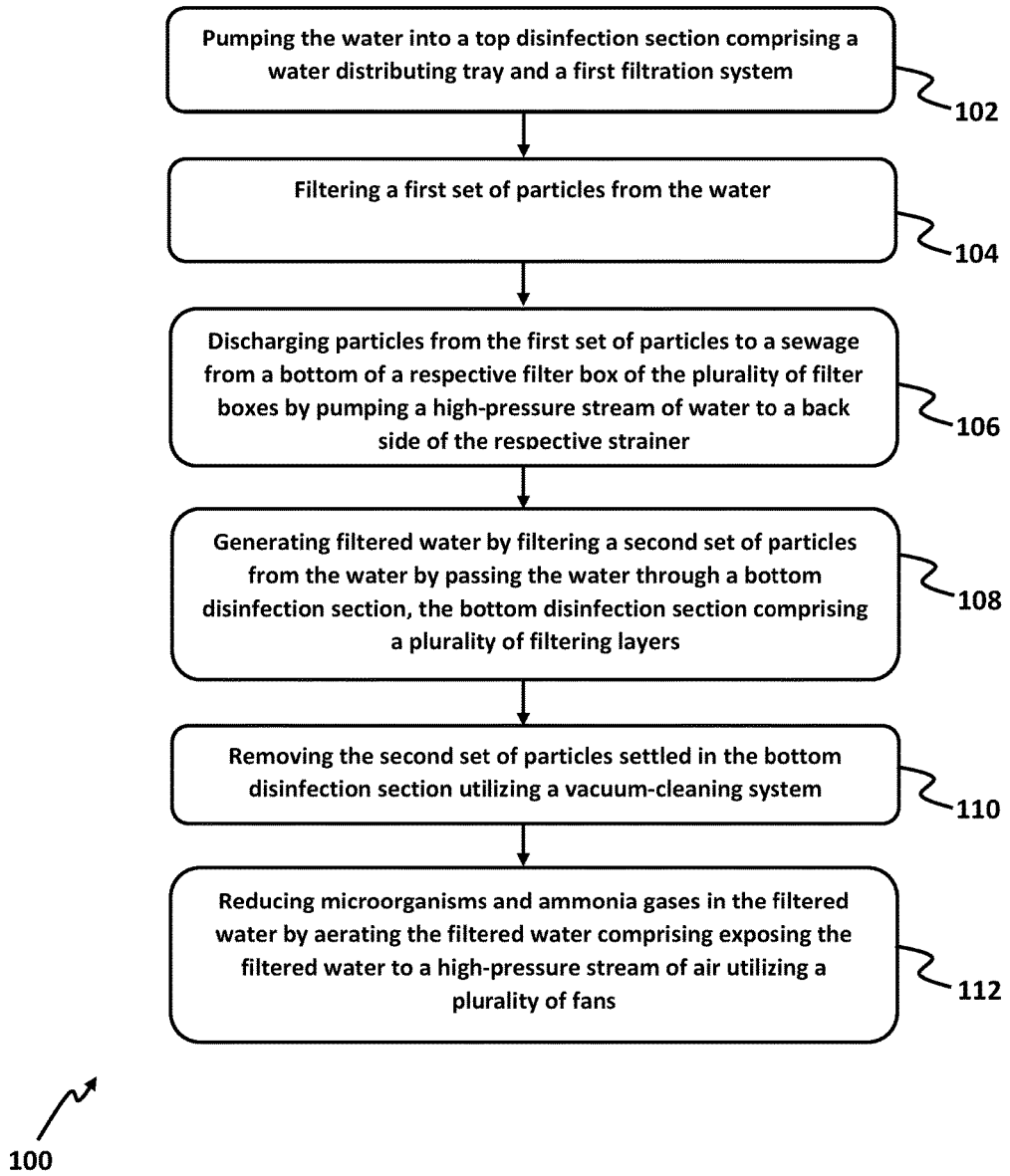
FIG. 1A illustrates a method for disinfecting water, consistent with one or more exemplary embodiments of the present disclosure.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings. The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown but is to be accorded the widest possible scope consistent with the principles and features disclosed herein.

Water pollution is an important issue for societies and governments worldwide. Globally, many people do not have access to safe drinking water. As a result, a variety of devices and procedures have been developed for treating or filtering water. Some water filters use a mechanical filter to screen out and remove particulates and biological substances including bacteria, viruses, protozoa, and helminths that may be harmful if consumed.

Bodies of water, such as those that are found outdoors, are prone to contamination by bacteria, microorganisms, and other particles that reduce the purity of the water. Accordingly, exemplary systems and methods have been designed for reduction of these microorganisms and other unwanted particles in water. Some exemplary filtration systems comprise one or more containers with filter media enclosed therein, wherein pond water is moved through the container and the filter media of an exemplary system is configured to filter bacteria and other waste.

Movement of water within current filtering containers is caused by water being forced into the filtering container by a pump. Thus, water tends to move through the filtering container in a generally uniform pattern where the water repeatedly circulates in the same portions of the filtering container. Because movement of the water is caused only by the force of water being pumped into a filtering container, the amount of movement of the water is limited by an amount of water that is being pumped into the filtering container.

Thus, the interaction between the water and the filter media, which is treated to kill microorganisms in the water, may not be sufficient to provide a desired level of filtration prior to the water being expelled from the filtering container. However, if the interactions between the filter media and the water could be increased, the amount of waste material filtered by the filter media would correspondingly be increased. Accordingly, exemplary systems and methods that increase movement of water within filtering containers in order to increase filtering interactions between the water and the filter media are desired for improving water filtration.

Additionally, in current filtration systems, a path of movement of the water within the container is typically repetitive, such as in a circular pattern. With the water moving in a repetitive pattern, the interaction of the water with the filter media is minimal and, thus, effectiveness of the filter media is minimized. However, if the water within a filtration container was urged to flow in non-repetitive path, the water would interact differently with the filter media and, thus, the filtering efficiency of an exemplary filter would increase. Accordingly, systems and methods for increasing filtration and treatment efficiency are desired. As will be discussed herein, exemplary systems and apparatuses directed to more efficiently disinfecting water, for example, a volume of water contained in a reservoir are disclosed.

In some exemplary embodiments of the present disclosure, the exemplary apparatus may comprise a top disinfecting section and a bottom disinfecting section. In an exemplary embodiment, the apparatus may comprise a water pump configured to dispense water intended for treatment over or into the top disinfecting section. However, in some exemplary embodiments, the water intended for treatment may be dispensed over or into the top disinfecting section by other mechanisms, for example, a storage tank may be placed above the top disinfecting section to dispense the water over or into the top disinfecting section due to the gravity force.

In an exemplary embodiment, the disclosed apparatus may comprise a water distributing tray and a filtration mechanism. The water distributing tray may be configured to dispense the water in a substantially distributed manner over the filtration mechanism. In an exemplary embodiment, the filtration mechanism may comprise a plurality of filter boxes disposed under the water distributing tray and inside a filter compartment. The plurality of filter boxes may be coupled with a first motor through a belt mechanism such that responsive to rotational movements of the first motor, the plurality of filter boxes move along a substantially closed elliptical path.

In an exemplary embodiment, each filter box from the plurality of filter boxes may comprise a strainer at a bottom of the filter box. Each filter box from the plurality of filter boxes may further comprise a plurality of parapet walls. Benefits from the use plurality of parapet walls may include, but are not limited, minimizing water loss from the filter box due to the fact that the plurality of parapet walls may provide a sealing mechanism for the plurality of filter boxes. Furthermore, the exemplary apparatus may comprise a high-pressure water jet configured to pump a high-pressure stream of water to a back side of the strainer in order to remove a first plurality of suspended particles which may settle at a bottom of the filter box.

In an exemplary embodiment, the bottom disinfection section may comprise a plurality of layers disposed in series next to each other. The plurality of layers may be configured to filter a set of particles from water. Furthermore, the disclosed apparatus may include a plurality of fans configured to aerate the water, thereby minimizing ammonia gases and microorganisms existing in the water.

Figure 1B:
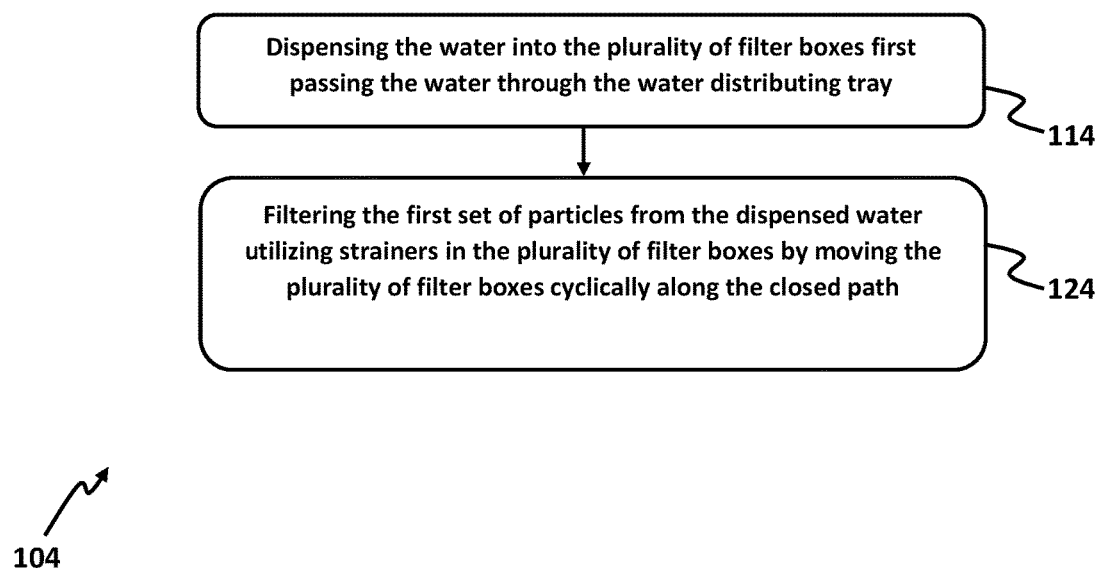
FIG. 1B illustrates a method for filtering a first set of particles from water, consistent with one or more exemplary embodiments of the present disclosure.
Figure 2:
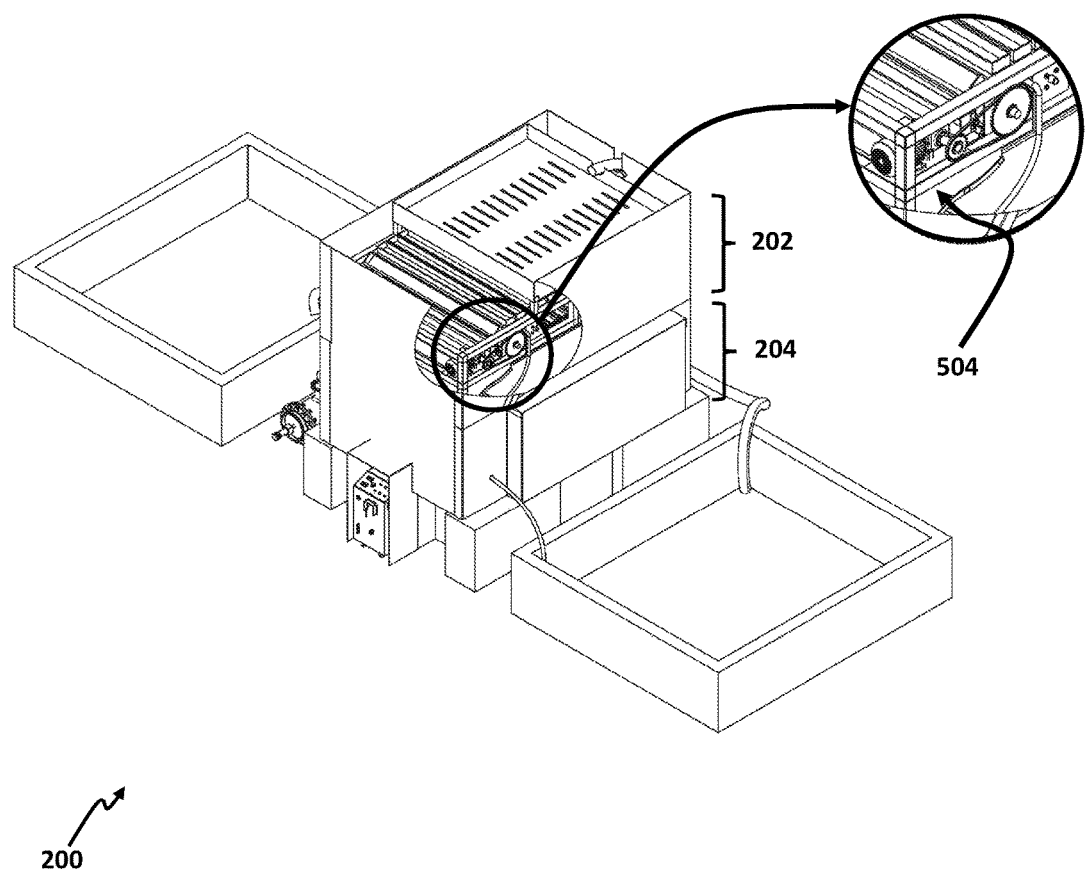
FIG. 2 illustrates a disinfection apparatus, consistent with one or more exemplary embodiments of the present disclosure.
Figure 3:
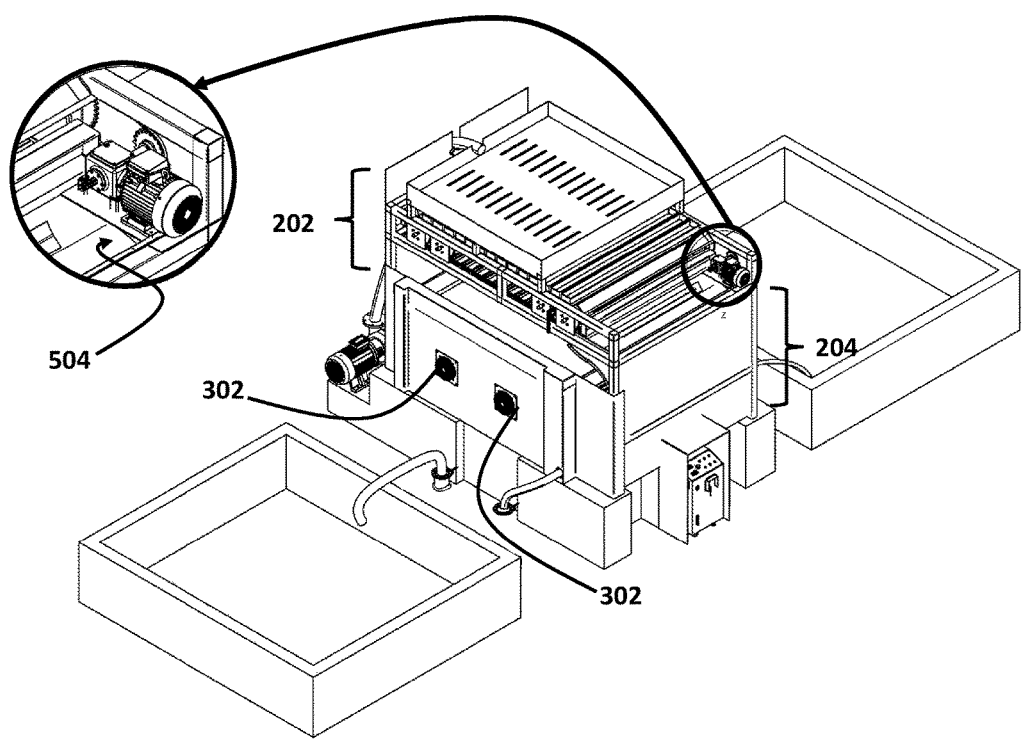
FIG. 3 illustrates a disinfection apparatus, consistent with one or more exemplary embodiments of the present disclosure.
Figure 4:
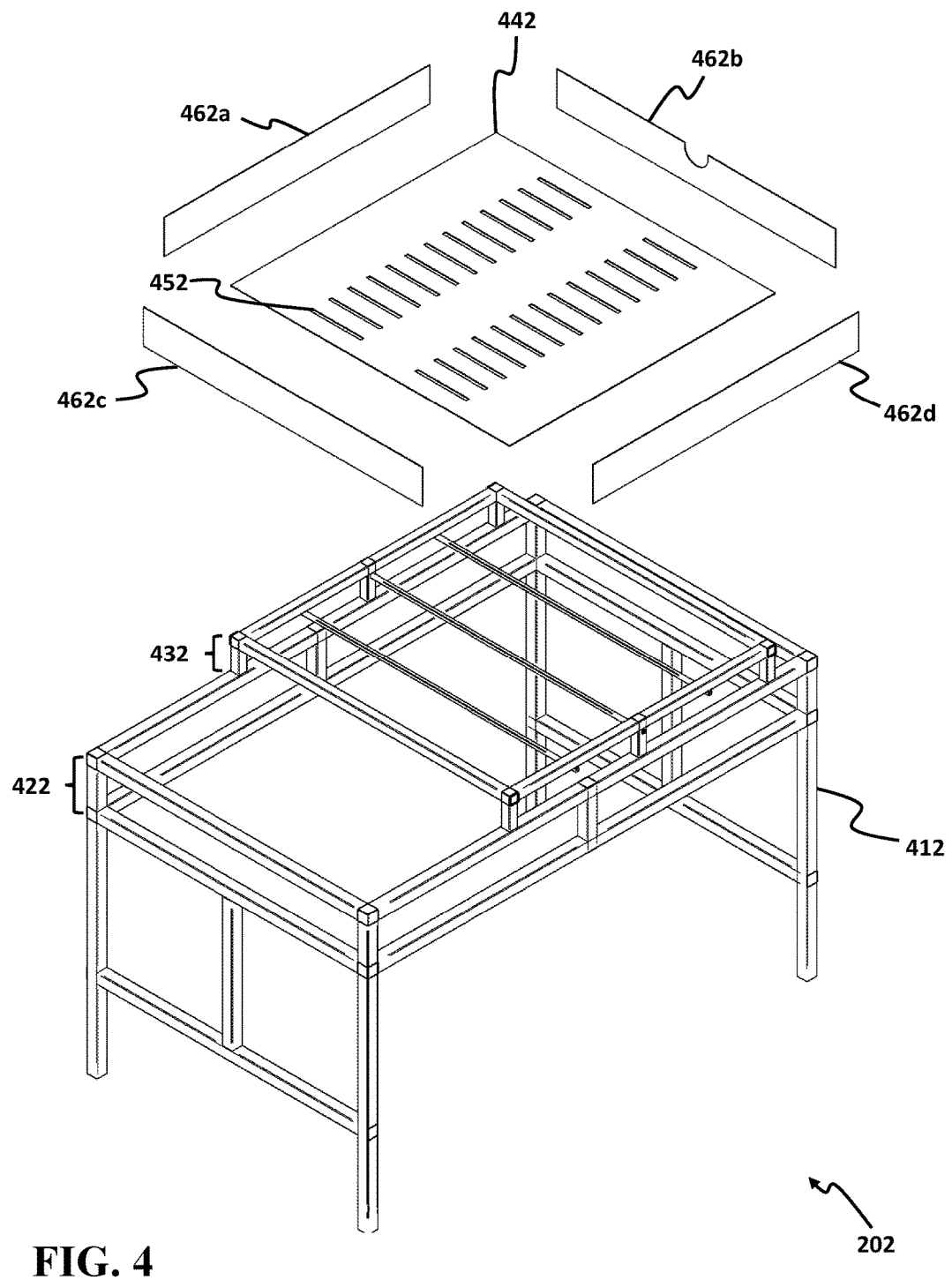
FIG. 4 illustrates a top disinfection section of a disinfection apparatus, consistent with one or more exemplary embodiments of the present disclosure.

Referring now to FIG. 1, method 100 for disinfecting water is illustrated in combination with structural elements displayed in FIGS. 2-7, consistent with one or more exemplary embodiments of the present disclosure. In some exemplary implementations, method 100 may utilize an exemplary apparatus that includes a top disinfection section, a bottom disinfection section, and a plurality of fans. As shown in FIG. 1, method 100 may include step 102 of pumping the water into a top disinfection section comprising a water distributing tray and a first filtration system. In some exemplary embodiments, the water distributing tray may comprise a plurality of parallel slots and the filtration system may comprise a plurality of filter boxes arranged in a closed path. In an exemplary embodiment, the top disinfection section utilized in step 102 of method 100 may be substantially similar to a top disinfection section 202 as shown in FIGS. 2 and 3. In some exemplary embodiments, as shown in FIG. 4, top disinfection section 202 may include a top chassis 412. In some embodiments, top chassis 412 may securely hold top disinfection section 202. Top disinfection 202 may further include a subsidiary top chassis 432. In one exemplary embodiment, a water distributing tray 442 may be mounted firmly on subsidiary top chassis 432. In some exemplary embodiments, water distributing tray 442 may comprise a plurality of parallel slots 452. For purpose of reference, it may be understood that a size of water distributing tray 442 may be matched to a size of subsidiary top chassis 432.

In an exemplary embodiment, as shown in FIG. 4, a first plurality of parapet walls 462 may be attached seamlessly to an outer circumference of distributing tray 442. For example, four first parapet walls 462a, 462b, 462c, and 462d that may have a substantially rectangular shape may be welded seamlessly to four sides of water distributing tray 442. Benefits from utilizing this configuration of plurality of parapet walls 462 according to exemplary embodiments may include, but are not limited to, creating a sealing mechanism that may minimize the water loss from water distributing tray 442. As shown in FIG. 4, top chassis 412 may further comprise a first filtration compartment 422 configured to hold a first filtration system.

With the further reference to FIG. 1, method 100 may include step 104 of filtering a first set of particles from the water. As shown in FIG. 1B, in some exemplary implementations, step 104 of method 100 may comprise a step 114 of dispensing the water into the plurality of filter boxes first passing the water through the water distributing tray, and a step 124 of filtering the first set of particles from the dispensed water utilizing strainers in the plurality of filter boxes by moving the plurality of filter boxes cyclically along the closed path.

Figure 5A:
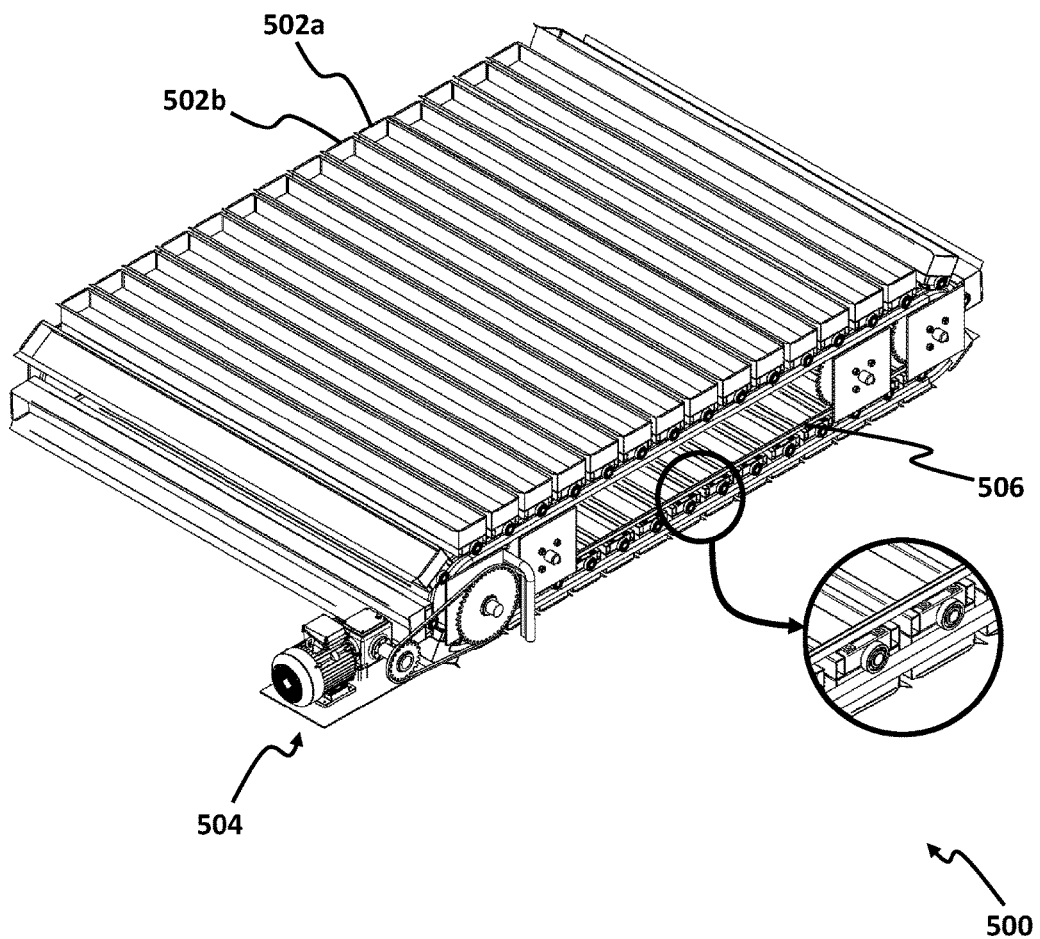
FIG. 5A illustrates a first filtration system of a top disinfection section, consistent with one or more exemplary embodiments of the present disclosure.

In an embodiment, the first filtration system utilized in method 100 may be substantially similar to a first filtration system 500 as shown in FIG. 5. In some exemplary embodiments, as shown in FIG. 5, first filtration system 500 may include a plurality of filter boxes 502 arranged in a closed path 506 configuration. For purpose of reference, it may be understood that in some embodiments, vertical closed path 506 may include a substantially closed elliptical path. In an alternative embodiment, vertical closed path 506 may include a substantially closed circular path.

Figure 5B:
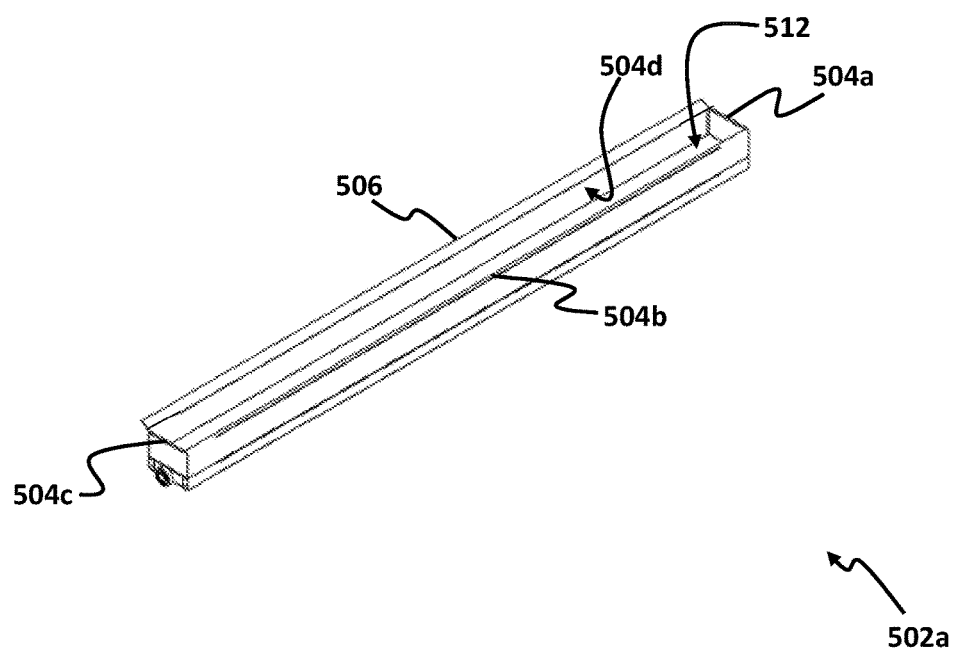
FIG. 5B illustrates a filter box of a first filtration system, consistent with one or more exemplary embodiments of the present disclosure.

As shown in FIG. 5B, in an exemplary embodiment, each filter box from plurality of filter boxes 502, for example, filter box 502a may include a strainer 512 at a bottom of filter box 502a. In an exemplary embodiment, strainer 512 may comprise a planar stainless steel strainer that is configured to filter suspended particles greater than approximately 500 μm from any water that is passed through it.

With further reference to FIG. 5B, in an exemplary embodiment, filter box 502a may further comprise a second plurality of parapet walls attached to an outermost circumference of filter box 502a. In an exemplary embodiment, second plurality of parapet walls 504 may comprise four second parapet walls 504a, 504b, 504c, and 504d that have a substantially rectangular shape. Benefits from utilizing second plurality of parapet walls 504 may include, but are not limited to, a sealing mechanism that may minimize the water loss from filter box 502a due to the fact that second plurality of parapet walls 504 may provide a sealing mechanism for filter box 502a.

As shown in FIG. 5B, in an exemplary embodiment, filter box 502a may comprise an inclined elongated part 506 attached to a parapet wall from second plurality of parapet walls 504, for example second parapet wall 504d. For purpose of reference, it may be understood that attaching inclined elongated part 506 to a parapet wall from second plurality of parapet walls 504 may provide various benefits including, but not limited to, minimizing of water loss that may be caused from a gap between two adjacent parapet walls from second plurality of parapet walls 504. In an exemplary embodiment, the inclined elongated part 506 may comprise a rectangular steel plate and the inclined elongated part may cover a gap between two adjacent filter boxes from the plurality of filter boxes 502 and providing a gable-roof type facility for the gap, thereby minimizing water loss from the gap between two adjacent filter boxes from the plurality of filter boxes 502. Referring again to FIG. 5, in an exemplary embodiment, plurality of filter boxes 502 may be coupled to a first electric motor 504. First electric motor 504 may move plurality of filter boxes 502 cyclically or in the shape of an exemplary closed path along vertical closed path 506. With further reference to FIG. 1, method 100 may further include step 106 of discharging particles from the first set of particles to a sewage from a bottom of a respective filter box of the plurality of filter boxes by pumping a high-pressure stream of water to a back side of the respective strainer.

In an exemplary embodiment, first filtration system 500 may comprise a high-pressure water pump. In an embodiment, the high-pressure water pump may be configured to pump a high-pressure stream of water to a back side of strainer 512. The high-pressure water pump may pump the high-pressure stream of water to the back side of strainer 512 in a way such that the particles are discharged to a channel that leads the particles to a sewage. In an exemplary embodiment, method 100 may further include step 108 of generating filtered water by filtering a second set of particles from the water by passing the water through a bottom disinfection section, the bottom disinfection section comprising a plurality of filtering layers. In some exemplary implementations, the bottom filtration section utilized in method 100 may be substantially similar to a bottom filtration section 204 as shown in FIG. 2.

Figure 6:
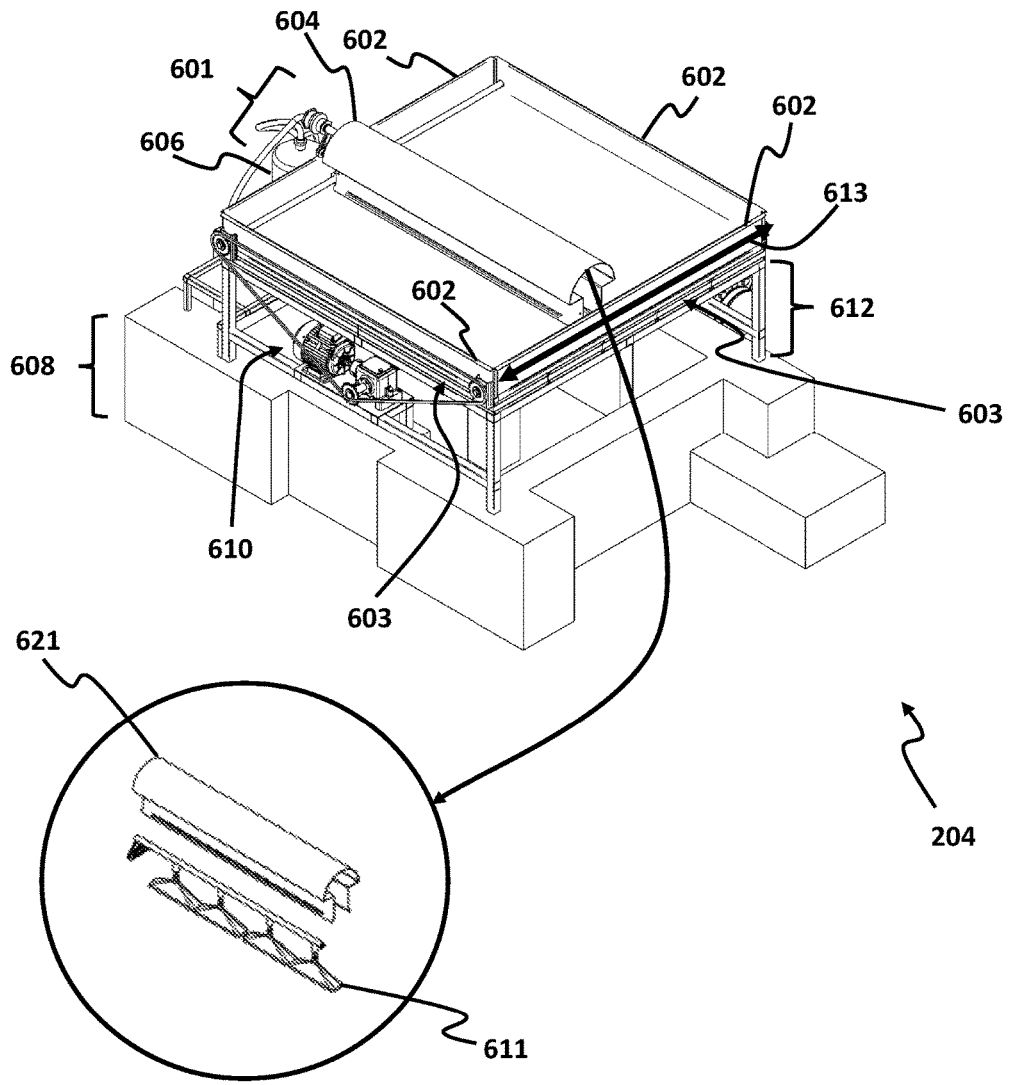
FIG. 6 illustrates a bottom disinfection section of a disinfection apparatus, consistent with one or more exemplary embodiments of the present disclosure.
Figure 7:
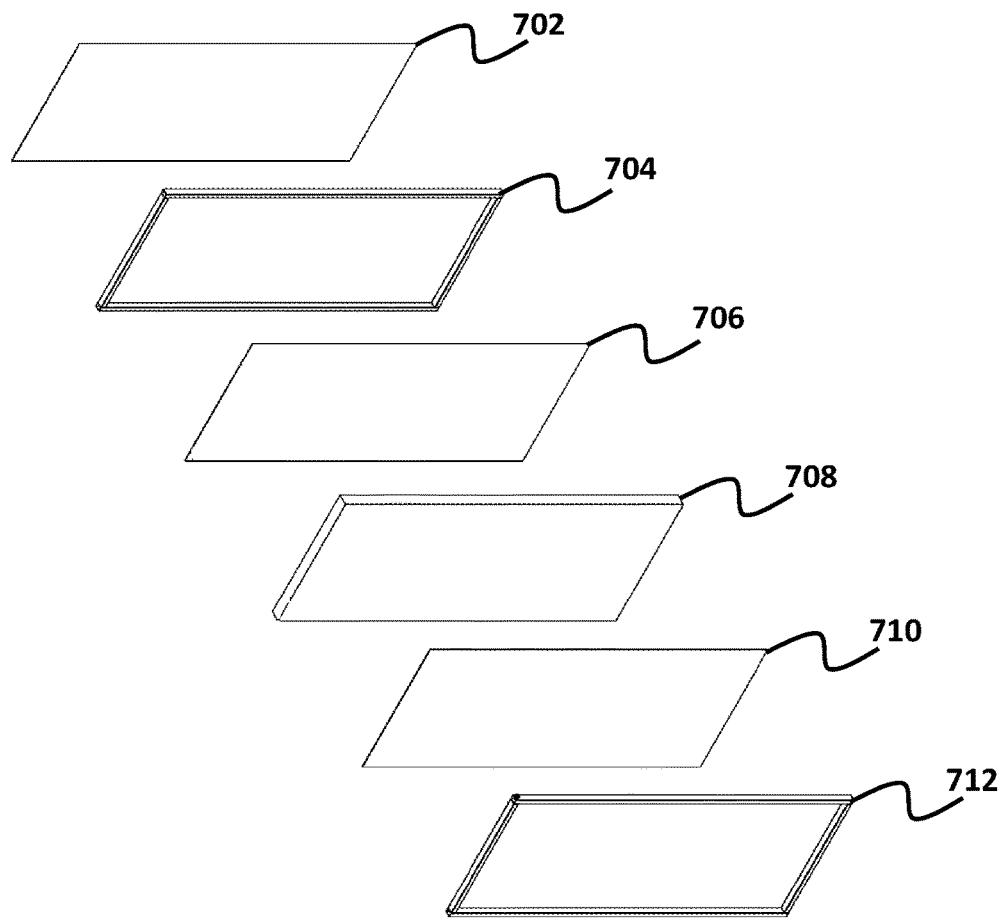
FIG. 7 illustrates a plurality of layers utilized in a bottom disinfection section of the disinfection apparatus, consistent with one or more exemplary embodiments of the present disclosure.

As shown in FIG. 6, in some exemplary embodiments, bottom filtration section 204 may comprise a bottom chassis 608 and a subsidiary bottom chassis 612 mounted on bottom chassis 608. Bottom filtration section 204 may further include a third plurality of parapet walls attached to an outermost circumference of bottom filtration section 204 in a configuration minimizing water loss from bottom filtration section 204. In some exemplary embodiments, bottom filtration section 204 may comprise a plurality of layers 603. As shown in FIG. 8, bottom filtration section 204 may further include a thick grid layer 702 including a first plurality of perforations with a first perforation, a sensitive grid layer 706 including a second plurality of perforations with a second perforation, a sand membrane layer 708 including a plurality of granules with a granule, and a super-sensitive grid layer 710 including a third plurality of perforations with a third perforation. In an exemplary embodiment, sensitive grid layer 706 may be disposed under thick grid layer 702. Similarly, sand membrane layer 708, may be disposed under sensitive grid layer 706, and super-sensitive grid layer 710 may be disposed under sand membrane layer 708.

In some exemplary embodiments, diameter of second plurality of perforations of sensitive grid layer 706 may be substantially smaller than the diameter of first plurality of perforations of thick grid layer 702. For purpose of reference, it may be understood that first plurality of perforations of thick grid layer 702 filter relatively large particles such as particles greater than 500 µm from water that passes through it, and second plurality of perforations of sensitive grid layer 806 filter relatively smaller particles such as particles greater than 100 µm from water that passes through it.

In an exemplary embodiment, diameter of the third plurality of perforations of super-sensitive grid layer 710 may be substantially smaller than diameter of the plurality of granules of sand membrane layer 708. The third plurality of perforations may prevent an exemplary plurality of granules from passing through the third plurality of perforations of super-sensitive grid layer 710. In some exemplary embodiments, a first frame 704 may be utilized between thick grid layer 702 and sensitive grid layer 706. And similarly, a second frame 712 may be utilized under super-sensitive grid layer 710. Benefits from utilizing this configuration of first frame 704 and second frame 712 according to exemplary embodiments may include, but are not limited to, providing a gap between layers that may help the water distribution.

In an exemplary embodiment, method 100 may further include step 110 of removing a second set of particles settled in the bottom disinfection section utilizing a vacuum-cleaning system. As shown in FIG. 6, in some exemplary implementations, the vacuum-cleaning system in step 106 of method 100 may be substantially similar to a vacuum-cleaning system 601. In some exemplary embodiments, vacuum-cleaning system 601 may remove the second set of particles which may be settled during water disinfection process in different layers of bottom filtration section 204 through a suction mechanism. In an embodiment, vacuum-cleaning system 601 may comprise a plurality of funnels 611 in flow communication with a vacuum tank 606. Vacuum-cleaning system 601 may further comprise a semi-circular roof 621 that, due to its shape and its configuration, may minimize water pour on plurality of funnels 611. In some exemplary embodiments, vacuum-cleaning system 601 may be coupled to a second electric motor 610 such that responsive to rotational movement of electric motor 610, plurality of funnels 611 move back and forth along a length 613 of bottom filtration section 204. Accordingly, vacuum-cleaning system 601 may remove the second plurality of particles by sucking the second plurality of particles during reciprocating movement of plurality of funnels 611 along the length 613 of bottom filtration section 204.

Referring back to FIG. 1, in some exemplary embodiments, method 100 may further include step 112 of reducing microorganisms and ammonia gases in the filtered water by aerating the filtered water comprising exposing the filtered water to a high-pressure stream of air utilizing a plurality of fans. In some exemplary implementations, the plurality of fans utilized in step 112 of method 100 may be substantially similar to a plurality of fans 302 as shown in FIG. 3.

In some exemplary embodiments, method 100 may further comprise stopping the suction mechanism and reciprocating movement of the plurality of funnels and discharging particles accumulated in the vacuum tank 606 from the vacuum tank 606 into the sewage.

Referring now to FIGS. 2-7, an apparatus 200 for disinfecting water is illustrated, consistent with one or more exemplary embodiments of the present disclosure. In some exemplary embodiments, as shown in FIG. 4, top disinfection section 202 may include a top chassis 412. In some embodiments, top chassis 412 may securely hold top disinfection section 202. Top disinfection 202 may further include a subsidiary top chassis 432. In one exemplary embodiment, a water distributing tray 442 may be mounted firmly on subsidiary top chassis 432. In some exemplary embodiments, water distributing tray 442 may comprise a plurality of parallel slots 452. For purpose of reference, it may be understood that a size of water distributing tray 442 may be matched to a size of subsidiary top chassis 432.

In an exemplary embodiment, as shown in FIG. 4, a first plurality of parapet walls 462 may be attached seamlessly to an outer circumference of distributing tray 442. For example, four first parapet walls 462a, 462b, 462c, and 462d that may have a substantially rectangular shape may be welded seamlessly to four sides of water distributing tray 442. Benefits from utilizing this configuration of plurality of parapet walls 462 according to exemplary embodiments may include, but are not limited to, creating a sealing mechanism that may minimize the water loss from water distributing tray 442. As shown in FIG. 4, top chassis 412 may further comprise a first filtration compartment 422 configured to hold a first filtration system.

In an embodiment, the first filtration system utilized in method 100 may be substantially similar to a first filtration system 500 as shown in FIG. 5. In some exemplary embodiments, as shown in FIG. 5, first filtration system 500 may include a plurality of filter boxes 502 arranged in a closed path 506 configuration. For purpose of reference, it may be understood that in some embodiments, vertical closed path 506 may include a substantially closed elliptical path. In an alternative embodiment, vertical closed path 506 may include a substantially closed circular path.

As shown in FIG. 5B, in an exemplary embodiment, each filter box from plurality of filter boxes 502, for example, filter box 502a may include a strainer 512 at a bottom of filter box 502a. In an exemplary embodiment, strainer 512 may comprise a planar stainless steel strainer that is configured to filter suspended particles greater than approximately 500 μm from any water that is passed through it.

With further reference to FIG. 5B, in an exemplary embodiment, filter box 502a may further comprise a second plurality of parapet walls attached to an outermost circumference of filter box 502a. In an exemplary embodiment, second plurality of parapet walls 504 may comprise four second parapet walls 504a, 504b, 504c, and 504d that have a substantially rectangular shape. Benefits from utilizing second plurality of parapet walls 504 may include, but are not limited to, a sealing mechanism that may minimize the water loss from filter box 502a due to the fact that second plurality of parapet walls 504 may provide a sealing mechanism for filter box 502a.

As shown in FIG. 5B, in an exemplary embodiment, filter box 502a may comprise an inclined elongated part 506 attached to a parapet wall from second plurality of parapet walls 504, for example second parapet wall 504d. For purpose of reference, it may be understood that attaching inclined elongated part 506 to a parapet wall from second plurality of parapet walls 504 may provide various benefits including, but not limited to, minimizing of water loss that may be caused from a gap between two adjacent parapet walls from second plurality of parapet walls 504. In an exemplary embodiment, the inclined elongated part 506 may comprise a rectangular steel plate and the inclined elongated part may cover a gap between two adjacent filter boxes from the plurality of filter boxes 502 and providing a gable-roof type facility for the gap, thereby minimizing water loss from the gap between two adjacent filter boxes from the plurality of filter boxes 502. Referring again to FIG. 5, in an exemplary embodiment, plurality of filter boxes 502 may be coupled to a first electric motor 504. First electric motor 504 may move plurality of filter boxes 502 cyclically or in the shape of an exemplary closed path along vertical closed path 506.

In an exemplary embodiment, first filtration system 500 may comprise a high-pressure water pump. In an embodiment, the high-pressure water pump may be configured to pump a high-pressure stream of water to a back side of strainer 512. The high-pressure water pump may pump the high-pressure stream of water to the back side of strainer 512 in a way such that the particles are discharged to a channel that leads the particles to a sewage.

As shown in FIG. 6, in some exemplary embodiments, bottom filtration section 204 may comprise a bottom chassis 608 and a subsidiary bottom chassis 612 mounted on bottom chassis 608. Bottom filtration section 204 may further include a third plurality of parapet walls attached to an outermost circumference of bottom filtration section 204 in a configuration minimizing water loss from bottom filtration section 204. In some exemplary embodiments, bottom filtration section 204 may comprise a plurality of layers 603. As shown in FIG. 8, bottom filtration section 204 may further include a thick grid layer 702 including a first plurality of perforations with a first perforation, a sensitive grid layer 706 including a second plurality of perforations with a second perforation, a sand membrane layer 708 including a plurality of granules with a granule, and a super-sensitive grid layer 710 including a third plurality of perforations with a third perforation. In an exemplary embodiment, sensitive grid layer 706 may be disposed under thick grid layer 702. Similarly, sand membrane layer 708, may be disposed under sensitive grid layer 706, and super-sensitive grid layer 710 may be disposed under sand membrane layer 708.

In some exemplary embodiments, diameter of second plurality of perforations of sensitive grid layer 706 may be substantially smaller than the diameter of first plurality of perforations of thick grid layer 702. For purpose of reference, it may be understood that first plurality of perforations of thick grid layer 702 filter relatively large particles such as particles greater than 500 μm from water that passes through it, and second plurality of perforations of sensitive grid layer 806 filter relatively smaller particles such as particles greater than 100 μm from water that passes through it.

In an exemplary embodiment, diameter of the third plurality of perforations of super-sensitive grid layer 710 may be substantially smaller than diameter of the plurality of granules of sand membrane layer 708. The third plurality of perforations may prevent an exemplary plurality of granules from passing through the third plurality of perforations of super-sensitive grid layer 710. In some exemplary embodiments, a first frame 704 may be utilized between thick grid layer 702 and sensitive grid layer 706. And similarly, a second frame 712 may be utilized under super-sensitive grid layer 710. Benefits from utilizing this configuration of first frame 704 and second frame 712 according to exemplary embodiments may include, but are not limited to, providing a gap between layers that may help the water distribution.

As shown in FIG. 6, in some exemplary implementations, the vacuum-cleaning system in step 106 of method 100 may be substantially similar to a vacuum-cleaning system 601. In some exemplary embodiments, vacuum-cleaning system 601 may remove the second set of particles which may be settled during water disinfection process in different layers of bottom filtration section 204 through a suction mechanism. In an embodiment, vacuum-cleaning system 601 may comprise a plurality of funnels 611 in flow communication with a vacuum tank 606. Vacuum-cleaning system 601 may further comprise a semi-circular roof 621 that, due to its shape and its configuration, may minimize water pour on plurality of funnels 611. In some exemplary embodiments, vacuum-cleaning system 601 may be coupled to a second electric motor 610 such that responsive to rotational movement of electric motor 610, plurality of funnels 611 move back and forth along a length 613 of bottom filtration section 204. Accordingly, vacuum-cleaning system 601 may remove the second plurality of particles by sucking the second plurality of particles during reciprocating movement of plurality of funnels 611 along the length 613 of bottom filtration section 204.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study, except where specific meanings have otherwise been set forth herein. Relational terms such as "first" and "second" and the like may be used solely to distinguish one entity or action from another without necessarily requiring or implying any actual such relationship or order between such entities or actions. The terms "comprises," "comprising," or any other variation thereof, as used herein and in the appended claims are intended to cover a non-exclusive inclusion, encompassing a process, method, article, or apparatus that comprises a list of elements that does not include only those elements but may include other elements not expressly listed to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is not intended to be used to interpret or limit the scope or meaning of the claims. In addition, in the foregoing Detailed Description, it can be seen that various features are grouped together in various implementations. Such grouping is for purposes of streamlining this disclosure and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into this Detailed Description, with each claim standing on its own as a separately claimed subject matter.

While various implementations have been described, the description is intended to be exemplary, rather than limiting and it will be apparent to those of ordinary skill in the art that many more implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in the light of the attached claims and their equivalents. Also, various modifications and changes may be made within the scope of the attached claims.

What is claimed is:

1. A method for disinfecting water, the method comprising:
   pumping the water into a top disinfection section comprising a water distributing tray and a first filtration system, the water distributing tray comprising a plurality of parallel slots and the first filtration system comprising a plurality of filter boxes arranged in a closed path;
   filtering a first set of particles from the water, comprising:
      dispensing the water into the plurality of filter boxes first passing the water through the water distributing tray, wherein:
         each filter box from the plurality of filter boxes comprises a respective strainer at a bottom of the filter box;
         a respective plurality of parapet walls attached seamlessly to an outermost circumference of the respective strainer; and
         an inclined elongated part attached to a first parapet wall from the respective plurality of parapet walls; and
      filtering the first set of particles from the dispensed water utilizing strainers in the plurality of filter boxes by moving the plurality of filter boxes cyclically along the closed path;
   discharging particles from the first set of particles to a sewage from a bottom of a respective filter box of the plurality of filter boxes by pumping a high-pressure stream of water to a back side of the respective strainer;
   generating filtered water by filtering a second set of particles from the water by passing the water through a bottom disinfection section, the bottom disinfection section comprising a plurality of filtering layers;
   removing the second set of particles settled in the bottom disinfection section utilizing a vacuum-cleaning system; and
   reducing microorganisms and ammonia gases in the filtered water by aerating the filtered water comprising exposing the filtered water to a high-pressure stream of air utilizing a plurality of fans.

2. The method of claim 1, wherein the plurality of filtering layers comprises a thick grid layer including a first plurality of perforations, a sensitive grid layer including a second plurality of perforations, a sand membrane layer including a plurality of granules, and a super-sensitive grid layer including a third plurality of perforations.

3. The method of claim 2, wherein a diameter of each perforation from the second plurality of perforations is smaller than a diameter of each perforation from the first plurality of perforations, and wherein a diameter of each perforation from the third plurality of perforations is smaller than a size of each granule from the plurality of granules.

4. The method of claim 3, wherein the sensitive grid layer is disposed immediately under the thick grid layer, and wherein the sand membrane layer is disposed immediately under the sensitive grid layer, and wherein the super-sensitive grid layer is disposed immediately under the sand membrane layer.

5. The method of claim 4, wherein the super-sensitive grid layer prevents the plurality of granules from passing through perforations of the third plurality of perforations.

6. The method of claim 1, wherein filtering the first set of particles from the dispensed water utilizing strainers in the plurality of filter boxes by moving the plurality of filter boxes cyclically along the closed path comprises filtering suspended particles greater than 500 µm from the water.

7. The method of claim 1, wherein the inclined elongated part comprises a rectangular steel plate, the inclined elongated part covering a gap between two adjacent filter boxes from the plurality of filter boxes and providing a gable-roof type facility for the gap.

8. The method of claim 1, wherein the closed path comprises at least one of a closed elliptical path and a closed circular path.

9. The method of claim 1, wherein removing the second set of particles settled in the bottom disinfection section utilizing a vacuum-cleaning system comprises removing the second set of particles settled in the bottom disinfection section through a suction mechanism, the vacuum-cleaning system comprising a plurality of funnels in flow communication with a vacuum tank, the vacuum-cleaning system sucking the second set of particles from the bottom disinfection section during a reciprocating movement of the plurality of funnels, the reciprocating movement of the plurality of funnels comprising moving the plurality of funnels back and forth along a length of the bottom disinfection section.

10. The method of claim 9, further comprising stopping the suction mechanism and reciprocating movement of the plurality of funnels and discharging particles accumulated in the vacuum tank from the vacuum tank into the sewage.

11. An apparatus for disinfecting water, the apparatus comprising:
a top disinfection section comprising a water distributing tray and a first filtration system, the water distributing tray comprising a plurality of parallel slots and the first filtration system comprising a plurality of filter boxes arranged in a closed path, wherein:
the water distribution tray is configured to pass the water though the parallel slots into the plurality of filter boxes first passing the water through the water distributing tray;
each filter box from the plurality of filter boxes comprises a respective strainer at a bottom of the filter box;
a respective plurality of parapet walls attached seamlessly to an outermost circumference of the respective strainer;
an inclined elongated part attached to a first parapet wall from the respective plurality of parapet walls; and
the first filtration system is configured to:
move the plurality of filter boxes cyclically along the closed path;
filter the first set of particles from the dispensed water utilizing strainers in the plurality of filter boxes due to the movement of the plurality of boxes;
pump a high-pressure stream of water to a back side of the respective strainer; and discharge particles from the first set of particles to a sewage from a bottom of a respective filter box of the plurality of filter boxes utilizing the high pressure stream;
a bottom disinfecting section comprising a plurality of filtering layers configured to:
filter a second set of particles from the water by passing the water through the plurality of filtering layers to produce filtered water; and
remove the second set of particles settled in the bottom disinfection section utilizing a vacuum-cleaning system; and
a plurality of fans configured to expose the filtered water to a high-pressure stream of air to reduce microorganisms and ammonia gases existing in the filtered water by aerating the filtered water.

12. The apparatus of claim 11, wherein the plurality of filtering layers comprises a thick grid layer including a first plurality of perforations, a sensitive grid layer including a second plurality of perforations, a sand membrane layer including a plurality of granules, and a super-sensitive grid layer including a third plurality of perforations.

13. The apparatus of claim 12, wherein a diameter of each perforation from the second plurality of perforations is smaller than a diameter of each perforation from the first plurality of perforations, and wherein a diameter of each perforation from the third plurality of perforations is smaller than a size of each granule from the plurality of granules.

14. The apparatus of claim 13, wherein the sensitive grid layer is disposed immediately under the thick grid layer, and wherein the sand membrane layer is disposed immediately under the sensitive grid layer, and wherein the super-sensitive grid layer is disposed immediately under the sand membrane layer.

15. The apparatus of claim 14, wherein the super-sensitive grid layer is configured to prevent the plurality of granules from passing through perforations of the third plurality of perforations.

16. The apparatus of claim 11, wherein the inclined elongated part comprises a rectangular steel plate, the inclined elongated part covering a gap between two adjacent filter boxes from the plurality of filter boxes and providing a gable-roof type facility for the gap.

17. The apparatus of claim 11, wherein the closed path comprises at least one of a closed elliptical path and a closed circular path.

18. The apparatus of claim 11, wherein the vacuum-cleaning system comprises a plurality of funnels in flow communication with a vacuum tank, the vacuum-cleaning system sucking the second set of particles from the bottom disinfection section during a reciprocating movement of the plurality of funnels, the reciprocating movement of the plurality of funnels comprising moving the plurality of funnels back and forth along a length of the bottom disinfection section.

* * * * *